Figure 1:
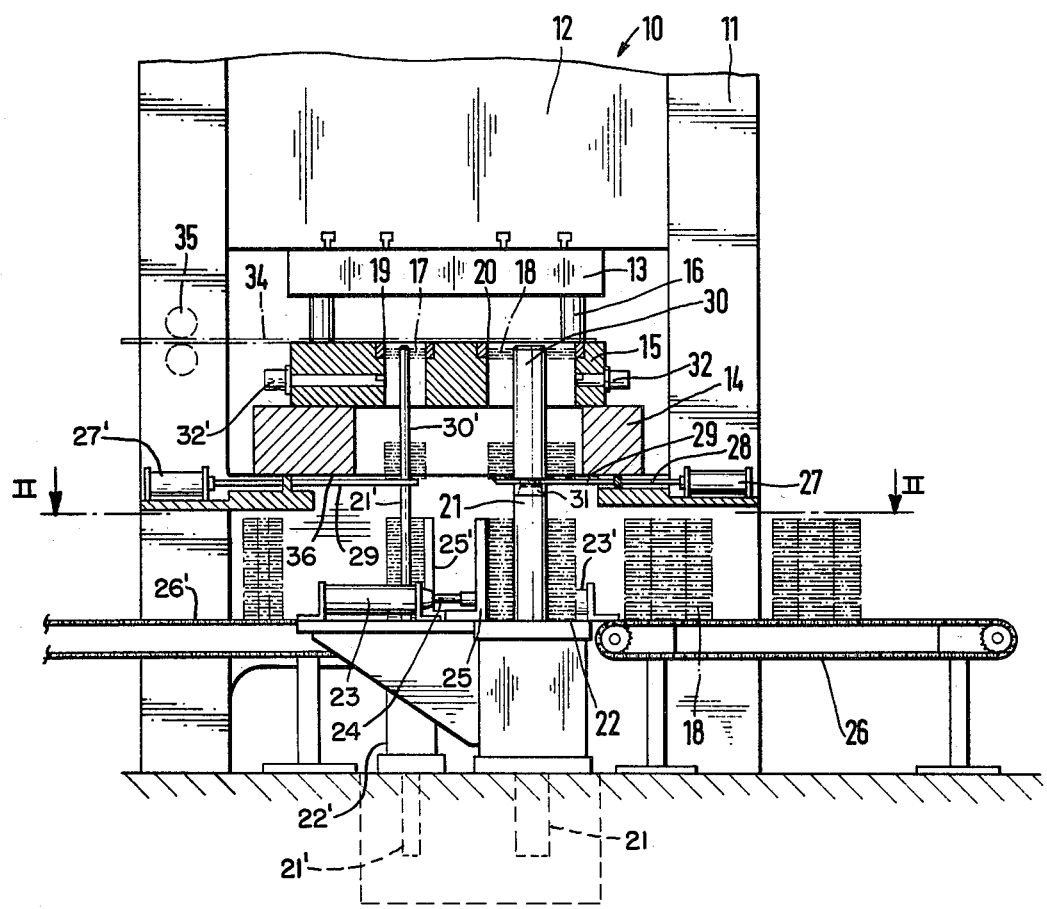

United States Patent [19]

Dangelmaier

[11] 4,111,086

[45] Sep. 5, 1978

[54] ALIGNING AND STACKING ARRANGEMENT

[75] Inventor: Karl Dangelmaier, Göppingen-Holzhiem, Fed. Rep. of Germany

[73] Assignee: L. Schuler GmbH, Fed. Rep. of Germany

[21] Appl. No.: 782,744

[22] Filed: Mar. 30, 1977

[30] Foreign Application Priority Data

Jul. 9, 1976 [DE] Fed. Rep. of Germany ....... 2630867

[51] Int. Cl.$^2$ .......................................... B21D 43/20
[52] U.S. Cl. .......................................... 83/90; 83/95; 83/97; 83/157
[58] Field of Search .......................... 83/89–97, 83/157

[56] References Cited

U.S. PATENT DOCUMENTS

| 1,426,760 | 8/1922 | Nichol | 83/95 X |
| 3,263,882 | 8/1966 | Nugent et al. | 83/95 X |
| 3,466,833 | 9/1969 | Penrod et al. | 83/95 X |

FOREIGN PATENT DOCUMENTS

| 2,121,578 | 8/1972 | France | 83/95 |
| 1,110,118 | 7/1961 | Fed. Rep. of Germany | 83/92 |

*Primary Examiner*—J. M. Meister
*Attorney, Agent, or Firm*—Craig & Antonelli

[57] ABSTRACT

An alignment and stacking arrangement for stampings manufactured in a continuous stamping operation by a stamping machine having a punch and associated punch matrix. At least one stacking channel is arranged in the punch matrix for receiving the stampings with an intermediate stack forming device being arranged at the stamping machine at a position below and independent of the punch matrix. The intermediate stack forming device may include at least one locking pawl for reducing the clearance of the stacking channel and/or a mandrel arranged in the stacking channel which is selectively engaged by a holding element during the formation of the intermediate stack. A stacking mandrel or stacking shaft is associated with the mandrel and is displaceable so as to permit a stack of stampings of a predetermined height to be carried away from the stamping machine by a conveyor arrangement.

28 Claims, 2 Drawing Figures

ALIGNING AND STACKING ARRANGEMENT

The present invention relates to an aligning and stacking arrangement and, more particularly, to an arrangement for aligning and stacking stampings manufactured in a continuous stamping process with the stampings being conveyed vertically in a stacking channel through a matrix of a punching die and stacked by way of a guide on a conveyor arrangement.

An aligning and stacking arrangement has been proposed, for example, in German Pat. No. 1,110,118, wherein stampings, for example, E-laminations for magnetic cores of transformers, are manufactured, aligned and stacked with the stacking being effected by way of a vertical stacking channel extending through a matrix of a punching die. A guide provided with permanent magnets feeds the aligned and stacked laminations to a conveyor, whereby the laminations are carried away when a desired or sufficient stack height is attained. In operation of this proposed construction, the stamping machine and the associated material feed are halted during a conveying operation and the bar magnets functioning as the guides maintain the non-conveyed laminations in an aligned position. As apparent, the halting of the stamping machine and associated material feed while a complete stack is being carried away results in an intermittent operation of the overall apparatus, thereby considerably increasing the total processing time and reducing the overall efficiency of the apparatus.

To render the method of operation of the arrangement proposed in the afore-mentioned German Patent more efficient, it is suggested in British Patent No. 1,307,961 to provide magnetic conveyor belts at an area below the stacking channels with the stampings being arranged on the magnetic conveyor belt and being subsequently carried away from the area of the stamping machine. In this latter construction, stacking devices with means for forming intermediate stacks are provided at the ends of the conveyor belt, in which stacking devices the stacking channels are exactly designed so that only the lowest stamping is fed onto the magnetic conveyor belts during each punching operation, thereby ensuring that the stampings are fed onto the conveyor belts in a partly overlapping position. To ensure alignment and stacking on the stacking devices forming the intermediate stacks, additional means are provided for aligning the stacks, which means admittedly operate satisfactorily; however, the provision of such means considerably increases the overall cost of the apparatus.

In commonly assigned U.S. patent application Ser. No. 768,343 (corresponding to German Application No. P 2605983.6-14), filed Feb. 14, 1977, entitled "Aligning and Stacking Arrangement", the disclosure of which is incorporated herein by reference to the extent necessary in understanding the present invention, a device for aligning and stacking stampings manufactured by a continuous stamping operation is proposed which allows efficient and optimal operation at considerably reduced cost without requiring additional means such as proposed in the above-noted prior art constructions for ensuring the alignment and stacking of the stampings.

The aim underlying the present invention resides in improving the arrangement in the afore-mentioned United States Application by providing a construction for interrupting the stacking process which is independent of a matrix of a punch.

In accordance with one feature of the present invention, an arrangement for interrupting a stacking is provided which is arranged below and independent of a matrix of the punch.

Moreover, in accordance with the present invention, the arrangement which interrupts the stacking can readily be adjusted to various punching dies in a simple manner while changing a tool, for example, in tool backing plates which can readily be swung out of the operating area of the stamping machine.

Advantages of the construction according to the present invention reside in the fact that, as with the arrangement disclosed in the afore-mentioned copending United States Application, high operational safety and efficiency can be achieved without the additional expense of providing magnetic conveyor belts since an alignment and stacking are accomplished directly through a stacking channel in the matrix of the punching die.

Accordingly, it is an object of the present invention to provide an arrangement for aligning and stacking stampings which avoids by simple means the afore-mentioned shortcomings and drawbacks encountered in the prior art.

A further object of the present invention resides in providing an arrangement for aligning and stacking stampings which assures an accurate stacking under all operating conditions, yet minimizes the number of parts therefor.

A still further object of the present invention resides in providing an arrangement for aligning and stacking stampings which permits rapid, uncomplicated alignment and stacking without interrupting the stamping operation.

Figure 2:
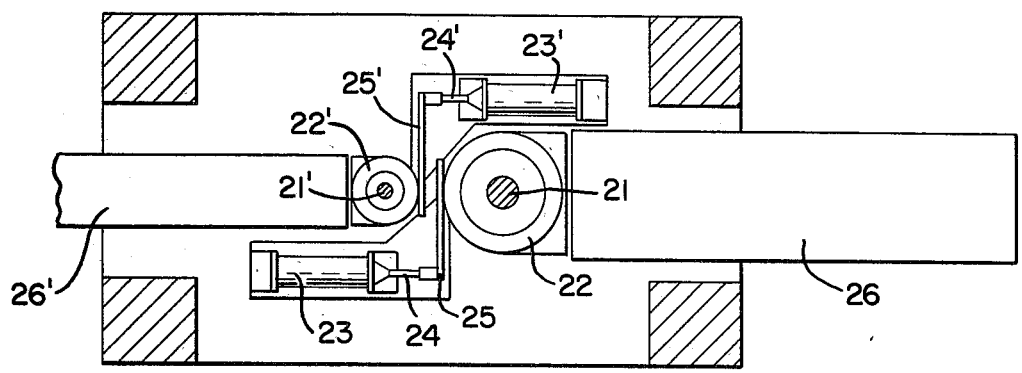

These and other objects, features and advantages of the present invention will become more apparent from the following description when taken in connection with the accompanying drawings which show, for the purposes of illustration only, one embodiment in accordance with the present invention, and wherein:

FIG. 1 is a side view of a stamping machine equipped with an arrangement for aligning and stacking stampings in accordance with the present invention; and FIG. 2 is a cross-sectional view taken along the line II—II of FIG. 1.

Referring now to the drawings, wherein like reference numerals are used in both views to designate like parts, according to FIGS. 1 and 2, a stamping machine generally designated by the reference numeral 10, constructed as a high speed press, includes a slide 12 guided in a press frame 11 with a punch 13 of a punching die being mounted on the slide 12 in a conventional manner. A tool backing or fixing plate 14 is conventionally mounted on a press table or fixed portion of the stamping machine 10 with a matrix 15 of the punching die being conventionally mounted at the backing or fixing plate 14. Columnar guides 16 are provided for operationally linking the matrix 15 and punch 13.

In the illustrated embodiment, the punch 13 and matrix 15 are constructed so as to stamp rotor laminations 17 and stator laminations 18 for electrical equipment in a continuous stamping operation, that is, in one stamping operation or one downward stroke of the slide 12, rotor lamination 17 and stator lamination 18 are produced. The matrix 15 is provided with a stacking channel 19 for stacking rotor laminations 17 and a stacking channel 20 for stacking stator laminations 18.

The stacking and aligning arrangement for the stator laminations 18 includes the stacking channel 20 formed in the matrix 15 with a guide fashioned as a stacking mandrel 21 being arranged in the stacking channel 20 extending vertically or in the stamping direction of the stamping machine 10. Stacking mandrel 21 is mounted at a stacking table 22 in such a manner so that it may be selectively raised and lowered in the stacking table 22. The stacking mandrel 21 and the stacking table 22 form a stacking station for the stator laminations 18.

A pneumatically or hydraulically actuated cylinder-piston unit 23 is disposed on the stacking table 22 with a piston rod 24 of the unit 23 being connected with a pusher 25 having, for example, a shape which conforms to the stator laminations 18. The pusher 25 functions to push or displace a completed stack of stator laminations 18 onto a chain conveyor 26 which carries the completed stack away from the stamping machine 10. Stacking station 21, 22, cylinder-piston unit 23 with pusher 25, and chain conveyor 26 form a conveyor construction for the stator laminations 18.

An additional cylinder-piston unit 27 is mounted at the stamping machine 10 with a piston rod 28 thereof being connected to a slotted pusher 29 displaceably mounted beneath an upper edge of the press table 36. The slotted pusher 29 fits around a mandrel 30 provided with a circumferential holding groove 31. The slotted pusher 29 serves primarily as a holding device for the mandrel 30 which is operationally linked coaxially with the stacking mandrel 21 which, as indicated above, can be selectively raised and lowered in the stacking table 22. Additionally, a locking pawl 32 is provided in the matrix 15 for selectively reducing the clearance or size of the opening or internal dimension of the stacking channel 20. Locking pawl 32 may be actuated by suitable mechanical, electro-mechanical, pneumatic or hydraulic means (not shown).

Stacking mandrel 21 and mandrel 30 may each be provided with guide noses (not shown) of the type disclosed in the aforementioned United States Application for orienting the stamped stator laminations to be stacked with the strip stock 34 from which the rotor and stator laminations 17, 18 are stamped being advanced by way of a pusher or pair of feed rollers 35.

The mandrel 30, pusher 29, cylinder-piston unit 27 and locking pawl 32 serve to form an intermediate stack of laminations while a completed stack is being conveyed from the stacking table 22 to the chain conveyor 26. The formation of the intermediate stack does not necessarily require the utilization of the mandrel 30, pusher 29, cylinder-piston unit 27 and locking pawl 32, but rather an intermediate stack may also be formed by utilization of the locking pawl 32 alone or by employing the mandrel 30 and pusher 29 alone. Likewise, in lieu of the stacking mandrel 21, an appropriately shaped stacking shaft may be employed.

The operation of the aligning and stacking arrangement described hereinabove is as follows:

Each time slide 12 of the stamping machine 10 descends, rotor and stator laminations 17, 18 are punched out of the strip stock 34. Stator laminations 18 are aligned as they fall through the stacking channel 20 which corresponds to the shape of the groove and fit over mandrel 30 and stacking mandrel 21 on stacking table 22 since the pusher 29 is disengaged by the cylinder-piston unit 27 and the locking pawl 32 is also disengaged.

As soon as a predetermined stack height has been attained, as determined by a known sensor such as a switch (not shown) sensing the height of the stack of laminations, the pusher 29 is displaced by the associated cylinder-piston unit 27 so that the mandrel 30 is held in place in the stacking channel 20 by the pusher 29 engaging the holding groove 31 of the mandrel 30. Stator laminations 18 which continue to be punched out are temporarily stacked on pusher 29 and mandrel 30, while stacking mandrel 21 is lowered below the plane of the stacking table 22 and the stack of stator laminations 18 is transferred to the chain conveyor 26 by pusher 25 actuated by cylinder-piston unit 23.

As soon as pusher 25 has returned to its initial position, stacking mandrel 21 is again raised and brought into an operational mesh coaxially with the mandrel 30. The cylinder-piston unit 27 and therewith the pusher 29, as well as the locking pawl 32, are released and returned to their respective initial positions so that the intermediate stack which has been formed during the lowering and raising of the stacking mandrel 21 is transferred to the stacking table 22. The punched stator laminations 18 are then fed directly to the stacking table 22 until a complete stack has been formed, whereupon the sensor switch then repeats the above-noted process to cause the engagement of the pusher 29 with the mandrel 30 and the engagement of the locking pawl 32 to form an intermediate stack while the completed stack is transferred to the conveyor 26.

The locking pawl 32 is employed in order to avoid problems such as, for example, a jamming of the stator laminations 18 during an engagement of the pusher 29 since the pawl 32 ensures a reliable separation of the stator laminations 18 falling through the channel 20 as soon as the pawl 32 is engaged. While the locking pawl 32 is illustrated as being disposed at the matrix 15, it is understood that such pawl may also be arranged in the tool backing or fixing plate 14, whereby there is an automatic stabilizing of the punched sheet by the mandrel 30 held on the pusher 29. The punched laminations are guided on mandrel 30 while pawl 32 prevents falling of the laminations only on one side.

In the event the mandrel 30 is dispensed with during the formation of an intermediate stack, the stacking channel 20 may be provided with guide noses for the alignment and stacking of the laminations. In such a situation, the pusher 29 may also be dispensed with so that the intermediate stack is formed when the locking pawl 32 is engaged. Preferably, in this latter construction, a plurality, at least two, simultaneously actuable locking pawls 32 are provided which are disposed symmetrically with respect to the stacking channel 20.

As also shown in FIGS. 1 and 2, by providing a corresponding mandrel 30', locking pawl 32', stacking mandrel 21', stacking table 22', pusher 29', cylinder-piston unit 27', and cylinder-piston unit 23' at the stacking channel 19, a complete stack of rotor laminations 17 can be stamped in the above-described manner and subsequently removed from the stamping machine 10 by a lowering of the stacking mandrel 21' into the stacking table 22', during which time an intermediate stack of rotor laminations 17 would be formed with the stamped laminations being removed by a chain conveyor 26'.

Likewise, in the event no mandrel 30' is employed at the stacking channel 19, appropriate guide noses may be arranged at the stacking channel 19 with at least two symmetrically disposed locking pawls being provided for forming an intermediate stack of rotor laminations 17.

Moreover, as with the stacking channel 20, the intermediate stack of rotor laminations 17 may be formed at the stacking channel 19 by way of the locking pawl 32' alone or with the mandrel 30 and the pusher 29 alone. Likewise, the locking pawl 32' may be arranged at the matrix 15 or the tool fixing or backing plate 14 at an operative position with respect to the stacking channel 19 for reasons set forth hereinabove with respect to the locking pawl 32 arranged at the tool fixing plate 14.

While I have shown and described only one embodiment in accordance with the present invention, it is understood that the same is not limited thereto, but is susceptible of numerous changes and modifications as known to a person skilled in the art, and I therefor do not wish to be limited to the details shown and described herein, but intend to cover all such changes and modifications as are encompassed by the scope of the appended claims.

I claim:

1. An alignment and stacking arrangement for stampings manufactured in a continuous stamping operation by a stamping machine having a punch and an associated punch matrix, the alignment and stacking arrangement comprising: at least one stacking channel means arranged at the punch matrix for receiving stampings produced by the stamping machine during a continuous stamping operation, means for forming an intermediate stack of stampings upon a produced stack of stampings reaching a predetermined height, at least one mandrel means arranged within said at least one stacking channel means for receiving an intermediate stack of stampings during the formation of an intermediate stack of stampings, means arranged on the stamping machine at a position below and independent of the punch matrix for holding said mandrel means within said at least one stacking channel means during the formation of an intermediate stack of stampings, and means for conveying the stack of stampings having the predetermined height from the stamping machine during the formation of intermediate stack of stampings.

2. An arrangement according to claim 1, wherein said stacking channel means are formed in the punch matrix and extend in a stamping direction of the stamping machine.

3. An arrangement according to claim 2, wherein said intermediate stack forming means further includes at least one locking pawl means for reducing a clearance of the at least one stacking channel means only during the formation of an intermediate stack of stampings.

4. An arrangement according to claim 3, wherein a stacking mandrel is operatively associated with said mandrel means for guiding and accommodating stampings, and means are provided for selectively raising and lowering said stacking mandrel so as to permit the stack of stampings of the predetermined height to be conveyed by said conveying means.

5. An arrangement according to claim 4, wherein said mandrel means and said stacking mandrel are arranged in a coaxial relationship.

6. An arrangement according to claim 4, wherein the intermediate stack is formed within said at least one stacking channel.

7. An arrangement according to claim 4, wherein said holding means includes a slotted pusher engageable with said mandrel means, and wherein means are operatively associated with said slotted pusher for selectively displacing said slotted pusher into engagement with said mandrel means.

8. An arrangement according to claim 7, wherein said slotted pusher is displacably mounted beneath an upper edge of the press table, and wherein a holding groove means is provided on said mandrel means for accommodating said slotted pusher when said slotted pusher is brought into engagement with said mandrel means.

9. An arrangement according to claim 8, wherein said means for selectively displacing said slotted pusher includes a piston rod operatively connected with said slotted pusher and a cylinder-piston actuating means for actuating the piston rod.

10. An arrangement according to claim 1, wherein a stacking shaft is operatively associated with said mandrel means for guiding and accommodating stampings, and wherein means are provided for selectively raising and lowering said stacking shaft so as to permit a stack of stampings to be conveyed by said conveying means.

11. An arrangement according to claim 1, wherein the stamping machine includes a press table upon which the punch matrix is arranged, and wherein at least said holding means is arranged in said press table.

12. An arrangement according to claim 11, wherein a stacking mandrel is operatively associated with said mandrel means for guiding and accommodating stampings, and means are provided for selectively raising and lowering said stacking mandrel so as to permit the stack of stampings of the predetermined height to be conveyed by said conveying means.

13. An arrangement according to claim 12, wherein said conveyor means includes a stacking table, said stacking mandrel being mounted at said stacking table so as to be selectively raised and lowered with respect to an upper surface of said stacking table, means for selectively displacing a stack of stampings from said stacking table when said stacking mandrel is lowered below the upper surface of said stacking table, and a conveyor belt means arranged adjacent said stacking table for receiving the stack of stampings from the stacking table and carrying the same from the stamping machine.

14. An arrangement according to claim 1, wherein at least two stacking channel means are arranged at the punch matrix for receiving stampings produced by the stamping machine during a continuous stamping operation, means are associated with each of the stacking channel means for forming an intermediate stack of stampings upon a produced stack of stampings reaching a predetermined height including a mandrel means arranged within each of said stacking channel means for receiving an intermediate stack of stampings, means are associated with each of the stacking channel means for holding a respective mandrel means in an associated stacking channel means during the formation of an intermediate stack of stampings, and means are associated with each stacking channel means for conveying the respective stacks of stampings having the predetermined height from the stamping machine during the formation of the intermediate stack of stampings.

15. An arrangement according to claim 14, wherein each of said stacking channel means are formed in the punch matrix and extend in a stamping direction of the stamping machine.

16. An arrangement according to claim 15, wherein the stamping machine includes a press table upon which the punch matrix is arranged, and wherein each of said holding means of said at least two stacking channel means is arranged beneath an upper edge of the press table.

17. An arrangement according to claim 16, wherein an intermediate stack of stampings is formed within each of said at least two stacking channel means.

18. An arrangement according to claim 17, wherein each of said intermediate stack forming means further includes at least one locking pawl means for reducing a clearance of the respective stacking channel means only during the formation of an intermediate stack of stampings.

19. An arrangement according to claim 18, wherein a stacking mandrel is operatively associated with each of said mandrel means for guiding and accommodating stampings, and means are provided for selectively raising and lowering each of said stacking mandrels so as to permit the stack of stampings of the predetermined height to be conveyed by said conveying means.

20. An arrangement according to claim 19, wherein each of said holding means includes a slotted pusher engageable with said mandrel means, and wherein means are operatively associated with said slotted pusher for selectively displacing said slotted pusher into engagement with its associated mandrel means.

21. An arrangement according to claim 20, wherein each of said slotted pushers is displacably mounted beneath an upper edge of the press table and wherein a holding groove means is provided on each of the mandrel means for accommodating the associated slotted pusher when the slotted pusher is brought into engagement with said mandrel means.

22. An arrangement according to claim 21, wherein each of said conveyor means includes a stacking table at which is mounted the stacking mandrel so as to be selectively raised and lowered with respect to an upper surface of a stacking table, means for selectively displacing a stack of stampings from the respective stacking tables when the associated stacking mandrel is lowered below an upper surface of said stacking table, and conveyor belt means arranged adjacent said stacking table for receiving a stack of stampings from the respective stacking tables to carry the same from the stamping machine.

23. An arrangement according to claim 18, wherein a stacking shaft is operatively associated with each of said stacking channel means for guiding and accommodating stampings, and wherein means are provided for selectively raising and lowering the respective stacking shafts.

24. An arrangement according to claim 23, wherein at least two locking pawls are arranged at diametrically opposite positions in each of said stacking channel means.

25. An arrangement according to claim 1, wherein said intermediate stack forming means further includes at least one locking pawl means for reducing the clearance of the at least one stacking channel means only during the formation of an intermediate stack of stampings.

26. An alignment and stacking arrangement for stampings manufactured in a continuous stamping operation by a stamping machine having a punch and an associated punch matrix, the alignment and stacking arrangement comprising: at least one stacking channel means arranged at the punch matrix for receiving stampings produced by the stamping machine during a continuous stamping operation, means for forming an intermediate stack of stampings upon a produced stack of stampings reaching a predetermined height, said means for forming an intermediate stack being arranged on the stamping machine at a position below and independent of the matrix, and means for conveying the stack of stampings having the predetermined height from the stamping machine during the formation of the intermediate stack of stampings, said intermediate stack forming means includes at least one locking pawl means for reducing the clearance of the at least one stacking channel means, a mandrel means arranged within said at least one stacking channel means for receiving the stampings, and means for holding said mandrel means within said at least one stacking channel means during the formation of an intermediate stack of stampings.

27. An arrangement according to claim 26, wherein a stacking mandrel is operatively associated with said mandrel means for guiding and accommodating stampings, and means are provided for selectively raising and lowering said stacking mandrels so as to permit the stack of stampings of the predetermined height to be conveyed by said conveying means.

28. An arrangement according to claim 27, wherein said holding means includes a slotted pusher engageable with said mandrel means, and wherein means are operatively associated with said slotted pusher for selectively displacing said slotted pusher into engagement with said mandrel means.

* * * * *